United States Patent
Futterlieb et al.

(10) Patent No.: US 11,581,727 B2
(45) Date of Patent: Feb. 14, 2023

(54) ASSEMBLY FOR MONITORING A WINDING THRESHOLD TEMPERATURE

(71) Applicant: ebm-papst Mulfingen GmbH & Co., Mulfingen (DE)

(72) Inventors: Gerd Futterlieb, Obersontheim (DE); Jens Rössler, Mulfingen (DE); Malte Pils, Ilshofen-Oberaspach (DE); Oliver Kleinheinz, Schrozberg (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 220 days.

(21) Appl. No.: 16/650,879

(22) PCT Filed: Sep. 14, 2018

(86) PCT No.: PCT/EP2018/074899
§ 371 (c)(1),
(2) Date: Mar. 26, 2020

(87) PCT Pub. No.: WO2019/081123
PCT Pub. Date: May 2, 2019

(65) Prior Publication Data
US 2020/0244063 A1 Jul. 30, 2020

(30) Foreign Application Priority Data
Oct. 27, 2017 (DE) .................... 10 2017 125 312.2

(51) Int. Cl.
*H02P 25/02* (2016.01)
*H02P 6/12* (2006.01)
*H02H 7/085* (2006.01)

(52) U.S. Cl.
CPC ........ *H02H 7/0852* (2013.01); *H02H 7/0854* (2013.01)

(58) Field of Classification Search
CPC .................. H02P 21/18; H02P 21/26
See application file for complete search history.

(56) References Cited

U.S. PATENT DOCUMENTS 3,916,257 A 10/1975 Harper, Jr.
4,525,763 A 6/1985 Hardy et al.
(Continued)

FOREIGN PATENT DOCUMENTS

DE 68911098 T2 6/1994
DE 19939997 A1 3/2001
(Continued)

OTHER PUBLICATIONS

European Patent Office, Rijswijk, Netherlands, International Search Report of International Application No. PCT/EP2018/074899, dated Jan. 7, 2019, 2 pages.

*Primary Examiner* — Kawing Chan
*Assistant Examiner* — Charles S Laughlin
(74) *Attorney, Agent, or Firm* — Dickinson Wright PLLC

(57) ABSTRACT

A temperature monitoring device for protecting the winding of an electronically commutated electric motor from being heated over a specified limit temperature $T_G$ regardless of the rotational speed includes a phase current detection device for detecting the phase current $I_{Winding}$ for the motor windings, an overcurrent switch-off device for switching off the electric motor if a maximum permissible phase current $I_{Shutdown}$ is exceeded, and an overcurrent monitoring device, which is connected to the overcurrent switch-off device, in order to transmit to it a switch-off signal if the detected phase current $I_{Winding}$ exceeds the maximum permissible phase current $I_{Shutdown}$ ascertained by a detection and computing device, wherein an algorithm in which the measured ambient temperature $T_U$ is incorporated is used when ascertaining the maximum permissible phase current $I_{Shutdown}$.

7 Claims, 3 Drawing Sheets

| Insulation class | Permissible temperature rise in K |
|---|---|
| 105 | 75 |
| 120 | 90 |
| 130 | 95 |
| 155 | 115 |
| 180 | 140 |
| 200 | 160 |
| 220 | 180 |
| 250 | 210 |

(56) References Cited

U.S. PATENT DOCUMENTS

| | | | |
|---|---|---|---|
| 4,623,265 A | | 11/1986 | Poyser |
| 5,811,957 A | * | 9/1998 | Bose ............... H02P 21/34 |
| | | | 318/808 |
| 9,774,287 B1 | * | 9/2017 | Simili ............ H02P 21/0089 |
| 2012/0217916 A1 | | 8/2012 | Wu et al. |
| 2015/0188481 A1 | | 7/2015 | Chenowth |

FOREIGN PATENT DOCUMENTS

| | | |
|---|---|---|
| DE | 10045976 A1 | 3/2002 |
| DE | 102015108587 A1 | 12/2016 |
| WO | 9323904 A1 | 11/1993 |

* cited by examiner

| Insulation class | Permissible temperature rise in K |
|---|---|
| 105 | 75 |
| 120 | 90 |
| 130 | 95 |
| 155 | 115 |
| 180 | 140 |
| 200 | 160 |
| 220 | 180 |
| 250 | 210 |

ASSEMBLY FOR MONITORING A WINDING THRESHOLD TEMPERATURE

CROSS REFERENCE TO RELATED APPLICATIONS

This application is a 35 U.S.C. § 371 national phase application of International Application No. PCT/EP2018/074899, filed Sep. 14, 2018, which claims the benefit of priority under 35 U.S.C. § 119 to German Patent Application No. 10 2017 125 312.2, filed Oct. 27, 2017, the contents of which are incorporated herein by reference in their entirety.

FIELD

The invention relates to a method for protecting the winding of an electric drive, especially a DC motor for fans, against thermal overload regardless of the rotational speed, as well as an assembly for monitoring the winding limit temperature of such an electric drive.

BACKGROUND

The statements in this section merely provide background information related to the present disclosure and several definitions for terms used in the present disclosure and may not constitute prior art.

In electric drives and motors it is almost unavoidable for heat losses to occur in the motor, resulting in a temperature rise. Accordingly, an upper limit temperature exists for the electric motor, and once this is exceeded the motor may become damaged or shut down, e.g., because of failure of the insulation of a winding. The upper limit temperature depends, among other things, on the insulation class of the winding. The insulation classes and the maximum permissible limit temperatures are determined according to DIN 0530 Part 1, among others, while the maximum limit temperatures are established by DIN EN 61558 for the different classes of insulation.

As a result of operational disturbances at a drive unit or at the electric motor it-self, an unacceptably high temperature may occur in the electric motor. Such instances occur during anticipated high loading of the machine, such as during running difficulties or blocking of the mechanism, for example. Fouled ventilation grilles at the electric motor may also result in unwanted temperature rises. If the winding of the motor exceeds the permissible temperature, the electric motor will become damaged, possibly entailing a breakdown of the entire machine. There-fore, a determination of the winding temperature is necessary in order to protect the electric motor against overheating.

Furthermore, in the design of the motor one is forced to make a compromise between model size and loading torque. Especially when the motor is operated practically constantly below its rated torque and only brief load peaks occur above this, it makes economic sense not to design the motor for the load peaks, but rather for the anticipated mean value plus a safety margin. In order to avoid a needless overdimensioning, it is also necessary for this reason to ascertain the motor temperature or at least to monitor the upper limit temperature. Thus, solutions have been proposed at present in the prior art which propose, e.g., the measurement of the winding temperature and comprise a shut-off device that is triggered upon exceeding the limit temperature. Another procedure calls for limiting the winding current in dependence on the motor's rotational speed. The temperature rise of the windings of a motor is determined by the motor design of its winding impedance and the winding current. In a known type of motor with known winding impedance, the temperature rise of the winding may be determined in dependence on the winding current during a type testing. These current values so determined may then be used during the operation to protect the motor winding against thermal overload.

From patent application WO 93/23904 A1, for example, there is described a method for monitoring an electric motor in regard to a thermal overloading, where the purpose is to keep low the technical expense and the design volume of the required overload protection of the electric motor. For this, the loss power of the electric motor or a quantity proportional to this is calculated with the aid of measured motor data during the on time of the motor and then integrated. The integration value is compared to a predetermined threshold value, and if the integration value exceeds the threshold value the electric motor is switched off. This method does not allow for environmental factors, which are also responsible for the temperature behavior of the electric motor. An important factor of influence is the ambient temperature, so that one objective of the present disclosure is to provide a solution which takes account of the ambient temperature.

In other methods which try to make do without a temperature sensor the current drawn by the electric motor is monitored. If the motor current exceeds the permissible continuous current for a lengthy time, the motor is switched off by the motor protection switch or, in the case of rotary current motors with speed regulation, by the frequency converter.

Other methods for the protection of an electric motor against overheating call for a temperature measurement by means of a temperature sensor, which is primarily installed in the motor winding. Thus, e.g., thermal switches are installed in the winding in known designs of motors with molded stators prior to the molding process and the pigtails are connected to a circuit board. If the temperature determined in this way in the vicinity of the motor winding exceeds a given maximum permissible limit value, once again the shutting off of the electric motor is produced. Such a method is described in patent application DE 199 39 997 A1.

The devices and methods described in the prior art have a number of drawbacks, resulting in problems in practice. When using a temperature sensor, an adequate insulating layer is needed between the latter and the winding for the electrical insulation. At the same time, this insulating layer constitutes a thermal insulation, so that especially in event of overloading by high currents a temperature difference occurs between the electrically active portion of the winding itself and the temperature sensor. The result is a delayed switching off of the electric motor when the motor winding has already become overheated. This effect is further intensified by increased demands on the electrical insulation for the protection of personnel. Furthermore, a temperature sensor installed in the winding can only detect the temperature at a single point of the winding.

Therefore, the problem which the present disclosure proposes to solve is to over-come said drawbacks and to provide an assembly as well as a method for protecting an electric motor regardless of the rotational speed which can be realized with cost effectiveness and which also improves the load utilization of the motor, as well as reliably detecting an impermissible temperature of the windings of the electric motor in order to undertake a timely reduction of the motor load or a switching off of the motor at or before a thermal overloading.

SUMMARY

This problem is solved by a temperature monitoring assembly comprising a temperature monitoring device for protecting the winding of an electronically commutated electric motor from being heated over a specified limit temperature $T_G$ regardless of the rotational speed, comprising a phase current detection device for detecting the phase current $I_{Winding}$ for the motor windings, an overcurrent switch-off device for switching off the electric motor if a maximum permissible phase current IAbschalt is exceeded, and an overcurrent monitoring device, which is connected to the overcurrent switch-off device, in order to transmit to it a switch-off signal if the detected phase current $I_{Winding}$ exceeds the maximum permissible phase current IAbschalt ascertained by a detection and computing device, wherein an algorithm in which the measured ambient temperature $T_U$ is incorporated is used when ascertaining the maximum permissible phase current $I_{Shutdown}$.

This problem is further solved by a method for the temperature monitoring assembly, wherein the method comprises temperature monitoring of an electric motor having at least one winding regardless of the rotational speed.

The objective of the present disclosure is to detect the ambient temperature $T_U$ of the motor, the motor current, and the phase angle of the motor current. For this, according to the present disclosure, the winding current is detected by a measurement device and is transformed in the control unit by means of a Clark-Park transformation into the d/q coordinate system (pointer model). This has the advantage, according to the present disclosure, that the winding current being detected for the operation of the temperature monitoring assembly is then present as an equal value. For this, the geometrical sums of the d-winding current Id and the q-winding current Iq from the pointer model are determined over a predetermined interval of time $t_{mess}$ as the limit value $$I_{Winding} = \sqrt{Id^2 + Iq^2}$$

at which the winding temperature rise is below a permissible value $T_G$ of the insulation class established for the motor being protected on the basis of its design. In addition, during the motor type testing a maximum excess temperature $T_{max}$ is ascertained, up to which the winding can be operated with reduced winding current. These values are saved in a non-volatile memory of the motor controls. During operation of the motor, a specific correction factor $K_{TU}$ is then determined for the permissible maximum winding current upon exceeding of the permissible ambient temperature.

According to one aspect of the present disclosure, the determination of the correction factor $K_{TU}$ is done as follows:

$$K_{TU} = 1 \quad \text{for } T_U < T_Z$$

$$K_{TU} = 1 - \left(\frac{Tu - T\max}{T\max}\right) \quad \text{for } T_U > T_Z$$

where $T_U$: is the ambient temperature;

$T_Z$: is the maximum ambient temperature specified for the motor (e.g., can be determined during the type testing of the motor); and $T_{max}$: is the maximum permissible excess temperature (e.g., can be determined during the type testing of the motor).

In the operation of the motor, the measured values for the ambient temperature of the motor are used to calculate the shut-off value of the winding current $I_{Shutdown}$ at which the motor is switched off by a switch-off signal upon exceeding that value.

The mathematical algorithm for determining the maximum permissible winding current in dependence on the ambient temperature is as follows, according to another aspect of the present disclosure:

$$I_{Shutdown} = I_{Grenz} * K_{TU}$$

where $I_{Shutdown}$: is the mean value of the winding current at which the motor is switched off;

$I_{Limiting}$: is the maximum permissible mean value of the winding current $I_{Winding}$; and $K_{TU}$: is a correction factor According to another aspect of the present disclosure, a temperature monitoring device is provided for this to protect the winding of an electronically commutated electric motor against being heated above a given limit temperature $T_G$ regardless of the rotational speed, wherein this is configured with a phase current detection device for detecting the phase current $I_{Winding}$ for the motor windings, an overcurrent switch-off device for switching off the electric motor if a maximum permissible phase current $I_{Shutdown}$ is exceeded, and an overcurrent monitoring device, which is connected to the overcurrent switch-off device, in order to transmit to it a switch-off signal if the detected phase current $I_{Winding}$ exceeds the maximum permissible phase current $I_{Shutdown}$ ascertained by a detection and computing device, wherein an algorithm in which the measured ambient temperature $T_U$ is incorporated is used when ascertaining the maximum permissible phase current $I_{Shutdown}$.

In one embodiment of the of the present disclosure, an electronics is further provided in order to obtain by means of Clark-Park transformation from the winding current detected with the winding current detection device the d-winding current component and the q-winding current component in the pointer model and moreover the d-winding current component and the q-winding current component are factored into the algorithm for ascertaining the maximum permissible phase current $I_{Shutdown}$, this being preferably determined by the already indicated formula: $I_{Winding} = \sqrt{Id^2 + Iq^2}$.

It is moreover advantageous when a device is provided for detecting the ambient temperature $T_U$ or when this can be obtained from motor data.

In another embodiment of the present disclosure, it is provided that at least one readable storage device for the providing of target value data is connected to the detection and computing device for the ascertaining of the maximum permissible phase current $I_{Shutdown}$, wherein at least the maximum permissible ambient temperature $T_Z$, the maximum permissible excess temperature of the motor $T_{max}$ and the maximum permissible winding current $I_{Limiting}$ are provided as the target value data.

It is likewise advantageous when the target value data can be entered into the storage device via an existing data entry device, which is preferably designed as a nonvolatile storage.

A further aspect of the present disclosure relates to a method for temperature monitoring of an electric motor having at least one winding regardless of the rotational speed with a temperature monitoring device with the following steps:

a. measuring the phase current with the phase current detection device during a predetermined time interval t;

b. performing a Clark-Park transformation of the measured phase current to obtain the d-winding current component and the q-winding current component in the dq-pointer system;
c. calculating the geometrical sum of the d-winding current and the q-winding current by the following formula: $I_{Winding} = \sqrt{Id^2 + Iq^2}$
d. detecting the ambient temperature and
e. calculating the switch-off current by the above indicated algorithm: $I_{Shutdown} = I_{Limiting} \cdot K_{TU}$, where $K_{TU}$ is a correction factor determined as follows:

$$K_{TU} = 1 \qquad \text{for } T_U < T_Z$$

$$K_{TU} = 1 - \left(\frac{Tu - T\max}{T\max}\right) \text{ for } T_U > T_Z$$

The relations $T_U$, $T_Z$, $T_{max}$ have already been explained above.

Method may further be characterized in that the calculation in step e) is done by means of the detection and computing device.

In yet another embodiment of the method, it is provided that a comparator compares the detected phase current $I_{Winding}$ with the maximum permissible phase current $I_{Shutdown}$ and the overcurrent switch-off device switches off the electric motor or interrupts the commutation when $I_{Winding} > I_{Shutdown}$.

Moreover, it is of advantage for an automatic motor starting or restarting to occur upon expiration of a defined dead time after a switch-off process or an interruption process. In this way, it can be ensured that motors are also started once more after an overheating without needing a manual intervention by a servicing person.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figures 1, 2:
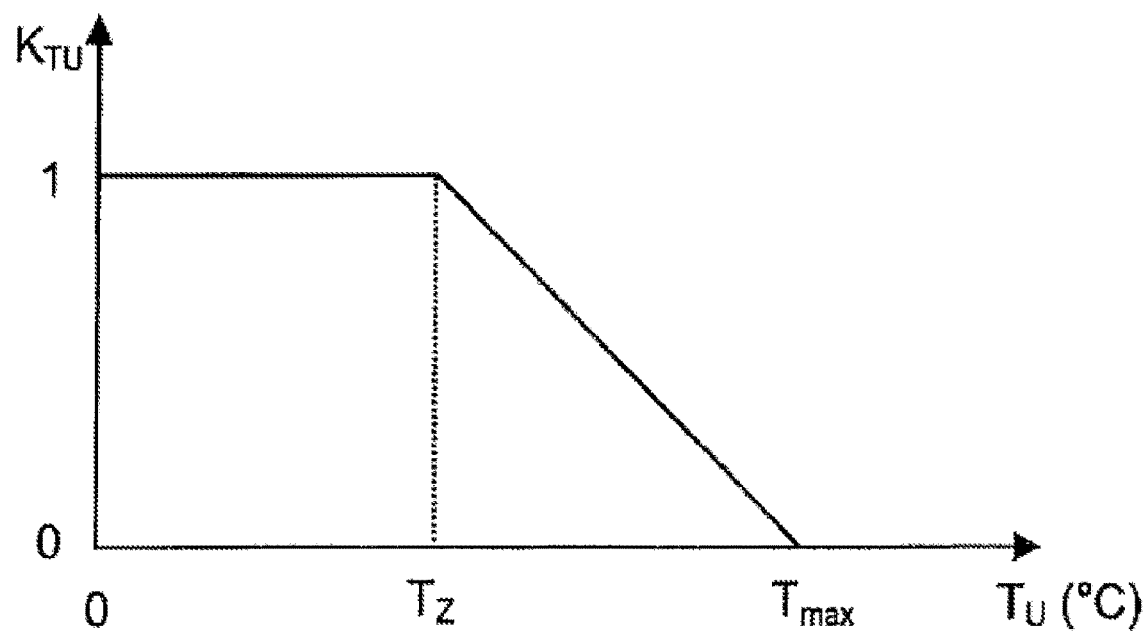
FIG. 1 shows a table representing the relationship between the insulation classes or the respective temperature values and the particular permissible temperature rise.
FIG. 2 shows a function graph of the correction factor in dependence on the ambient temperature.

The drawings are provided herewith for purely illustrative purposes and are not intended to limit the scope of the present invention.

DETAILED DESCRIPTION

The following description is merely exemplary in nature and is in no way intended to limit the present disclosure or its application or uses. It should be understood that throughout the description, corresponding reference numerals indicate like or corresponding parts and features.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

In the following, one aspect of the present disclosure shall be explained more closely with the aid of an embodiment with reference to FIGS. 1 to 4, where the same references are used for the same functional and/or structural features.

FIG. 1 shows a table representing the relationship between the insulation classes or the corresponding temperature values 105° (class A) to 250° and the respective permissible temperature rise in Kelvin. The temperature rise is determined here as the difference between the winding temperature and the ambient temperature.

FIG. 2 shows a function graph of the correction factor $K_{TU}$ in dependence on the ambient temperature $T_U$ with the designations $T_U$, $T_Z$, $T_{max}$ already explained in the context of the general description of the invention.

$$K_{TU} = 1 \qquad \text{for } T_U < T_Z$$

$$K_{TU} = 1 - \left(\frac{Tu - T\max}{T\max}\right) \text{ for } T_U > T_Z$$

The correction factor $K_{TU}$ diminishes in linear fashion with increasing ambient temperature $T_U$ from the maximum ambient temperature specified for the motor until the maximum excess temperature is reached. The motor can be operated in this range with diminished power.

Figure 3:
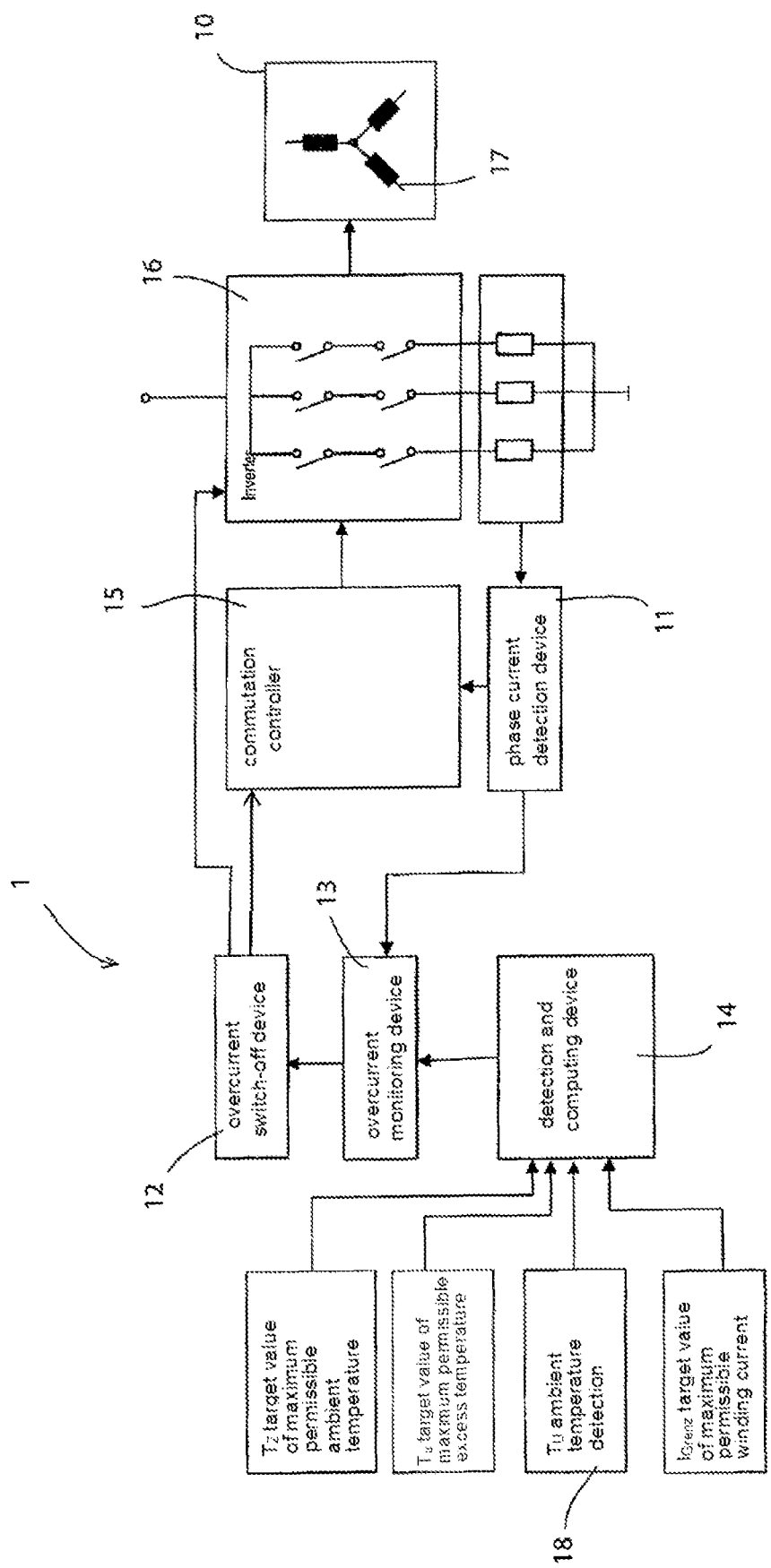
FIG. 3 shows a block diagram of an embodiment of a temperature monitoring device of an electric motor.

FIG. 3 shows a block diagram of an embodiment of a temperature monitoring device 1 of an electric motor. The temperature monitoring device 1 is designed to protect the winding of an electronically commutated electric motor 10 against heating above a particular limit temperature $T_G$ regardless of the rotational speed with a phase current detection device 11 for detecting the phase current $I_{Winding}$ for the motor windings. Moreover, an overcurrent switch-off device 12 is provided for switching off the electric motor 10 upon exceeding a maximum permissible phase current $I_{Shutdown}$.

The overcurrent switch-off device 12 is connected to an overcurrent monitoring device 11 in order to obtain from the latter a switch-off signal upon occurrence of the switch-off condition, namely, when the detected phase current $I_{Winding}$ exceeds the maximum permissible phase current $I_{Shutdown}$.

In order to determine or calculate the maximum permissible phase current $I_{Shutdown}$, a detection and computing device 14 is provided, which is connected to the overcurrent monitoring device 11.

Further, it can be recognized that the detection and computing device 14 is connected to devices for the obtaining of target values $T_Z$, $T_{max}$, $I_{Limiting}$ as well as the ambient temperature $T_U$. The ambient temperature is determined or measured with a device 18 for detection of the ambient temperature.

The phase current detection device 11 is connected to the commutation controller 15 and this in turn is connected to the inverter 16 for energizing the motor windings 17 of the electric motor E.

Figure 4:
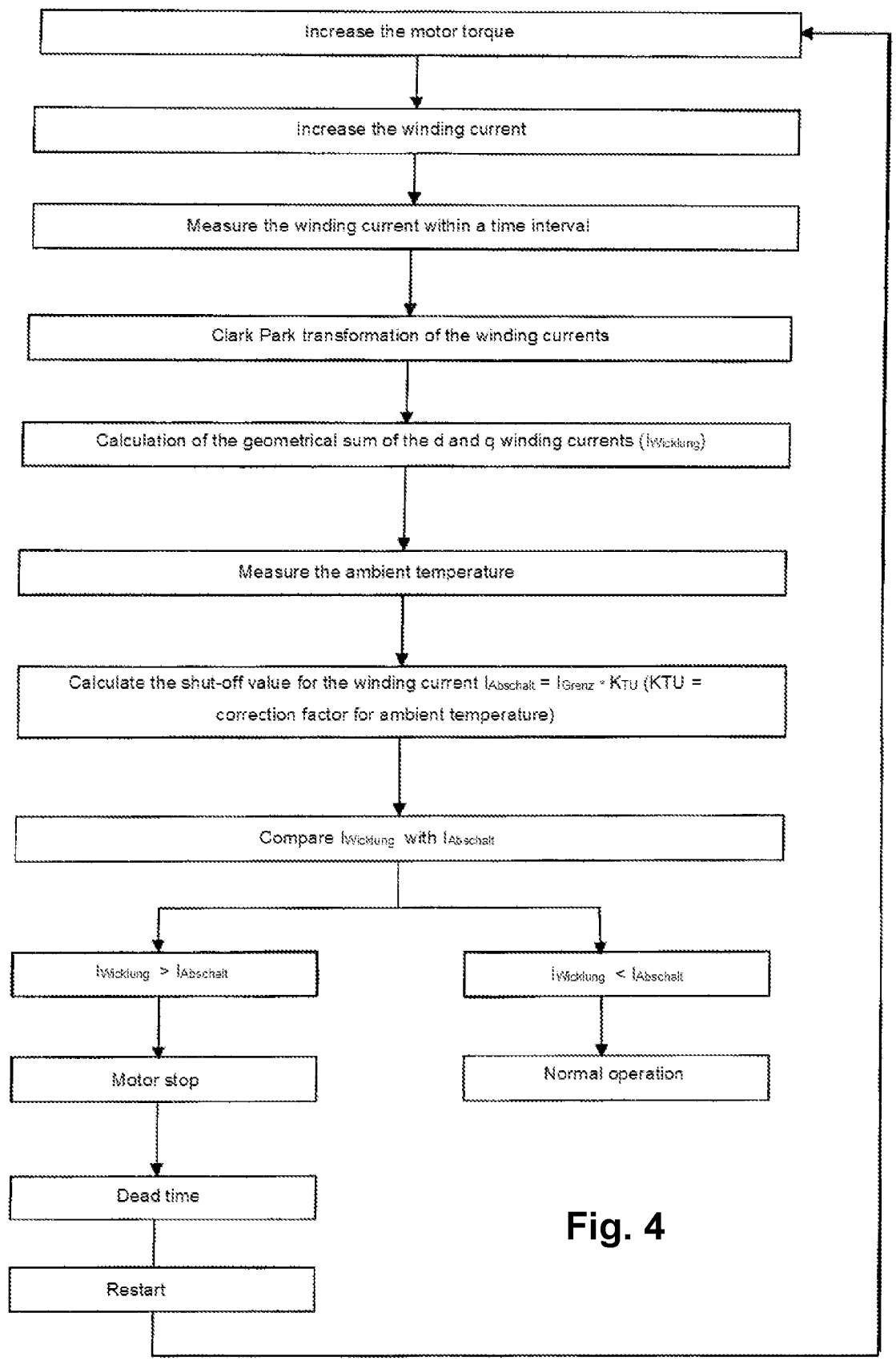
FIG. 4 shows a flow chart of the method according to the present disclosure.

FIG. 4 shows a flow chart in order to explain the method according to the present disclosure. In order to increase the motor torque, there occurs an increasing of the winding current, which is measured. After this, the already described steps are carried out until a comparator compares the detected phase current $I_{Winding}$ with the maximum permissible phase current $I_{Shutdown}$ and, when $I_{Winding} > I_{Shutdown}$, the overcurrent switch-off device 12 switches off the electric motor E or the commutation controller 15 interrupts the commutation. Otherwise, the normal operation is detected.

The present disclosure is not limited in its scope to the above indicated embodiments. Rather, a number of variants are conceivable, which make use of the represented solution even with fundamentally different configurations. Thus, as shown in the embodiment of FIG. 4, an automatic restarting of the motor may occur after expiration of a defined dead time after a switching off of the electric motor E.

While the above description constitutes the preferred embodiments of the present invention, it will be appreciated that the invention is susceptible to modification, variation and change without departing from the proper scope and fair meaning of the accompanying claims.

The invention claimed is:

1. A method for temperature monitoring of an electric motor having at least one winding regardless of the rotational speed with a temperature monitoring device; the method comprising the following steps:
   a) providing the temperature monitoring device comprising:
      a phase current detection device for detecting a phase current $I_{Winding}$ for the motor windings,
      an overcurrent switch-off device for switching off the electric motor if a maximum permissible phase current $I_{shutdown}$ is exceeded, and
      an overcurrent monitoring device, which is connected to the overcurrent switch-off device, in order to transmit to it a switch-off signal if the detected phase current $I_{Winding}$ exceeds the maximum permissible phase current $I_{Shutdown}$ ascertained by a detection and computing device, wherein an algorithm in which the measured ambient temperature $T_U$ is incorporated is used when ascertaining the maximum permissible phase current $I_{Shutdown}$;
   b) measuring the phase current with the phase current detection device during a predetermined time interval t;
   c) performing a Clark-Park transformation of the measured phase current to obtain a d-winding current component and a q-winding current component in a dq-pointer system;
   d) calculating a geometrical sum of the d-winding current and the q-winding current by the following formula:
   $$I_{Winding} = \sqrt{Id^2 + Iq^2}$$
   e) detecting ambient temperature, and
   f) calculating the switch-off current by the following algorithm:
   $$I_{Shutdown} = I_{Limiting} * K_{TU}$$
   where
   $I_{Shutdown}$: is the switch-off current, i.e., the mean value of the winding current at which the motor is switched off,
   $I_{Limiting}$: Is the maximum permissible mean value of the winding current $I_{Winding}$, and
   $K_{TU}$: is a correction factor, being determined as follows:

$$K_{TU} = 1 \quad \text{for } T_U < T_Z$$
   $$K_{TU} = 1 - \left(\frac{Tu - T\max}{T\max}\right) \quad \text{for } T_U > T_Z$$

where
   $T_U$: is the ambient temperature,
   $T_Z$: is the maximum ambient temperature specified for the motor, and
   $T_{max}$: is the maximum permissible excess temperature for the motor.

2. The method according to claim 1, wherein the calculation in step f) is done by means of the detection and computing device.

3. The method according to claim 1, wherein a comparator compares the detected phase current $I_{Winding}$ with the maximum permissible phase current $I_{Shutdown}$ and the overcurrent switch-off device switches off the electric motor or interrupts the commutation when $I_{Winding} > I_{Shutdown}$.

4. The method according to claim 3, wherein an automatic motor starting occurs upon expiration of a defined dead time after a switch-off process or an interruption process.

5. The method according to claim 2, wherein a comparator compares the detected phase current $I_{Winding}$ with the maximum permissible phase current $I_{shutdown}$ and the overcurrent switch-off device switches off the electric motor or interrupts the commutation when $I_{Winding} > I_{shutdown}$.

6. The method according to claim 1, wherein a readable storage device provides target value data to the detection and computing device; wherein the target value data comprises at least $T_z$, $T_{max}$, and $I_{Limiting}$.

7. The method according to claim 6, wherein the target value data is entered into the readable storage device via a data entry device.

* * * * *